United States Patent [19]

Gordon et al.

[11] Patent Number: 4,803,339
[45] Date of Patent: Feb. 7, 1989

[54] HOLLOW ELECTRODE AND ARC INITIATION METHOD

[75] Inventors: Stephen S. Gordon, Moorpark; Gerald E. Dyer, Canoga Park, both of Calif.; Lee A. Flanigan, Harvest, Ala.

[73] Assignee: Rockwell International Corporation, El Segundo, Calif.

[21] Appl. No.: 97,233

[22] Filed: Sep. 16, 1987

[51] Int. Cl.[4] ............................................. B23K 35/04
[52] U.S. Cl. .................................. 219/145.21; 219/75; 219/119; 219/124.01; 219/130.4
[58] Field of Search ................... 219/75, 124.01, 130.4, 219/119, 136, 121.52, 145.21

[56] References Cited

U.S. PATENT DOCUMENTS 3,715,561  2/1973  Hammarlind ........................ 219/75
4,598,191  7/1986  Marhic et al. ..................... 219/130.4

FOREIGN PATENT DOCUMENTS 3207537  10/1982  Fed. Rep. of Germany ........ 219/75

Primary Examiner—E. A. Goldberg
Assistant Examiner—Melissa C. Chiu
Attorney, Agent, or Firm—H. Frederick Hamann; Harry B. Field; David C. Faulkner

[57] ABSTRACT

An improved hollow electrode 10 and hollow electrode working tip 14 for a gas tunsten arc welding apparatus is disclosed. The hollow electrode face is formed as a lune-shaped radial surface 16 having two tapered intersecting cone-shaped angled surfaces 18. The improved electrode working tip provides a controllable stable arc resulting in an improved weld.

4 Claims, 2 Drawing Sheets

HOLLOW ELECTRODE AND ARC INITIATION METHOD

BACKGROUND OF THE INVENTION

1. Field of the Invention

This invention relates to arc welding and, more specifically, to electrode tip geometry for hollow electrodes used in a gas tungsten arc welding apparatus.

2. Background Art

Various gas tungsten arc welding apparatus are well known in the industry and find many applications. In general, the gas tungsten arc welding or GTAW apparatus comprises a non-consumable electrode and generally operates on direct current power applied to the electrode. During operation, an electric arc is formed between the working tip or face of the electrode and a metal workpiece. The electrode is often fabricated from tungsten or an alloy of tungsten in order to withstand the high temperatures inherent in the welding operation.

In the arc welding process, the relationship between electrode tip geometry and the arc stability has become increasingly important. It has, in the past, been the practice to control the area of electron emission for the arc by shaping the working tip of the electrode as a cone. The conical point may define a blunt or sharp tip; however, the conical point was generally formed as a sharp, 30° to 120° right circular cone.

A useful discussion of conical tip geometry may be found in *Welding Research Supplement*, "The Effect of Electrode Geometry in Gas Tungsten-Arc Welding", W. F. Savage et al, November 1965, pages 489-s to 496-s.

When using a hollow electrode with the GTAW process, the electrode tip cannot be shaped to a conical point because of the hole through the electrode. In addition, a small amount of inert gas flows through the hollow electrode. Both of these facts have a negative affect on arc stability and control.

In view of the foregoing, it would be a significant advancement in the art of gas tungsten arc welding with hollow electrodes to provide an electrode having a tip design configured to emit a controlled and stable arc.

SUMMARY AND OBJECTS OF THE INVENTION

The present invention is a novel hollow electrode configuration useful in an arc welding apparatus such as a gas tungsten arc welding apparatus in which an electrode face forming a terminus of the working end comprises a lune-shaped radial surface and two tapered intersecting cone-shaped angle surfaces. Yet another feature of the present invention is an electrode configuration having a novel means of arc initiation which will preclude the production of electromagnetic interference (EMI) or electrode/workpiece contamination.

It is therefore a primary object of this invention to provide improvements in hollow electrodes for gas tungsten arc welding processes.

Another object of this invention is to provide an improved hollow electrode in which the face of the working tip of the hollow electrode enhances welding performance.

Yet another object of this invention is to provide a hollow electrode having a movable plunger-like device situated within the throughbore for initiation of the arc without generating EMI or contaminating either the workpiece or the electrode tip.

These and other objects and features of the present invention will become more fully apparent from the following description and appended claims taken in conjunction with the accompanying drawings.

DETAILED DESCRIPTION OF THE PREFERRED EMBODIMENT

The invention is best understood by reference to the drawings wherein like parts are designated with like numerals throughout.

As shown in FIGS. 1A-1E, a hollow electrode 10 which may be tungsten or alloy thereof is cut so as to produce a hollow electrode having a preferred face configuration according to the present invention.

Figure 1A:
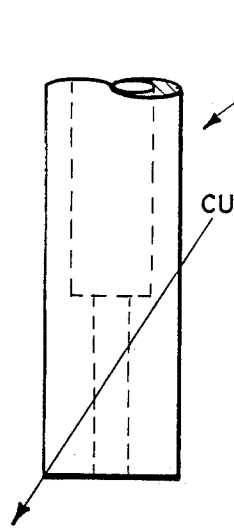
FIGS. 1A-1F depict a procedure for producing the working tip of a hollow electrode in accordance with the present invention.
Figure 1B:
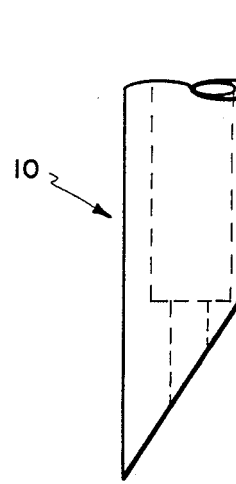
Figure 1C:
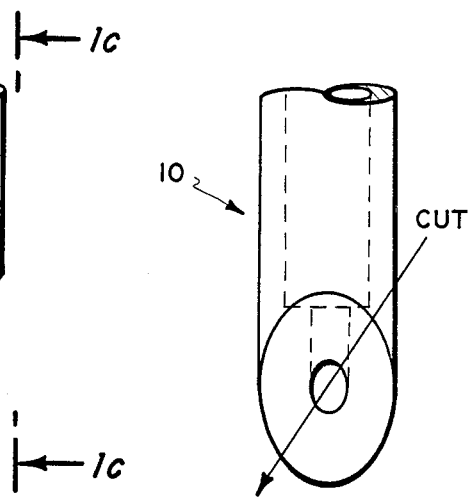
Figure 1D:
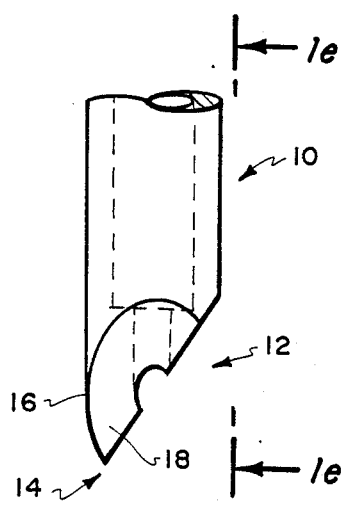
Figure 1E:
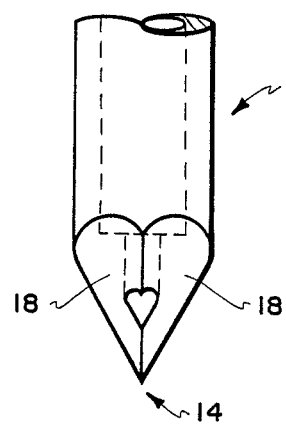

With respect to FIG. 1A, the electrode of the present invention having a generally flat circular base is first cut at an angle of from about a 30° to about a 45° to produce the electrode shown in FIGS. 1B and 1C. The electrode depicted in FIG. 1C as viewed along line 1-C of FIG. 1B is then cut to produce the electrode tip configuration shown in FIGS. 1D and 1E. FIG. 1E is a frontal view taken along line 1-E and clearly shows the electrode face 12 having a terminus or working end 14 comprising a lune-shaped radial surface 16 and two tapered intersecting cone-shaped angled surfaces 18.

Figure 1F:
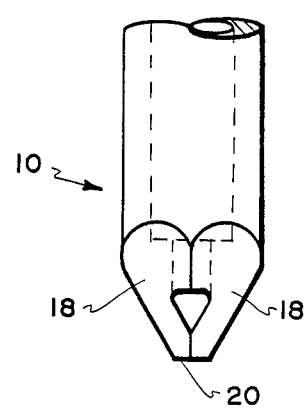
Figure 2:
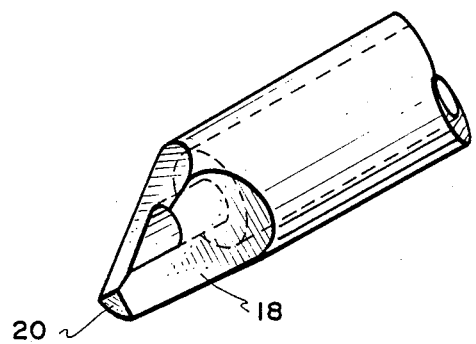
FIG. 2 is a prospective view of a hollow electrode tip according to the present invention.
Figure 3A:
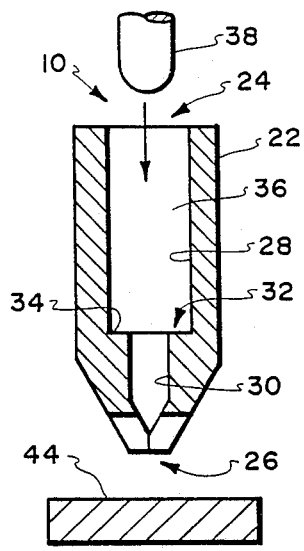
FIGS. 3A-3D disclose a hollow electrode interfacing a workpiece in which a movable plunger is provided for arc plasma initiation.
Figure 3B:
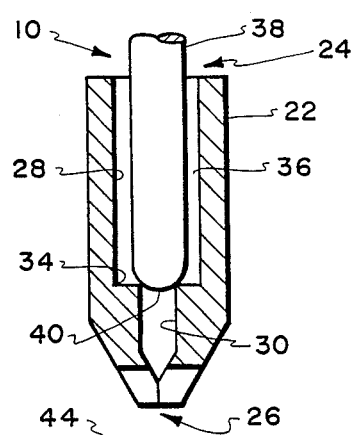
Figure 3C:
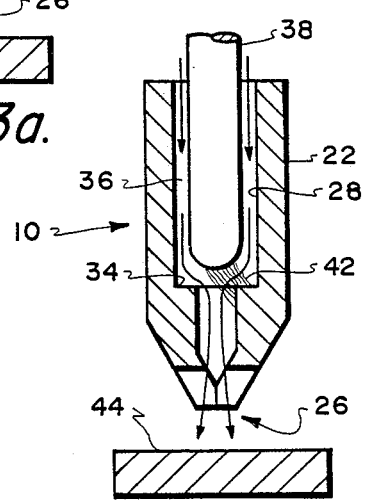
Figure 3D:
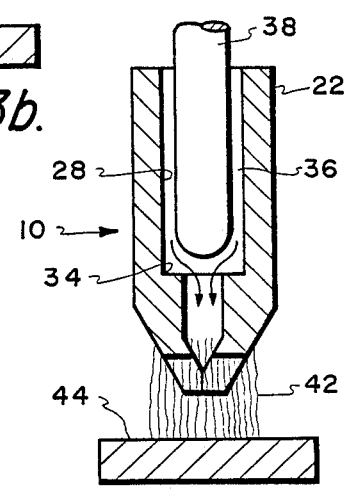

FIG. 1F is another embodiment of the electrode face configuration wherein the electrode tip depicted in FIG. 1E is modified to produce an electrode tip having a quasi-truncated cone configuration 20 (see also FIG. 2).

The hollow electrode of the present invention may be utilized in a gas tungsten arc welding apparatus as disclosed and claimed in U.S. Pat. No. 4,002,878 incorporated herein by reference. However, the hollow tungsten electrode 10 of the present invention as disclosed in FIGS. 3A-3D includes an electrically conductive cylindrical body 22 having a proximate end 24 and a working end 26.

A first cylindrical throughbore 28 is provided within the tungsten electrode. The first throughbore originates at the proximate end 24 and extends into and through the conductive cylindrical body 22 until it interfaces with a second cylindrical throughbore 30 terminating at the working end 26 and having an interior diameter less than the first throughbore.

A step 32 including surface areas 34 define a juncture of the first and second throughbores.

A passageway 36 defined by the throughbores and extending into and through the electrode is provided for conveying a working or inert gas such as argon, helium or a mixture thereof, through the passageway and out through the electrode tip.

Electrode 10 is configured so that the first throughbore diameter is from about 50% to about 70% of the diameter of the electrode while the second cylindrical throughbore diameter is from about 20% to about 40% of the diameter of the electrode. This is because the electrode is further provided with a movable electrically conductive plunger 38 which may be functioned by a spring mechanism, servo-drive with position sensors, or the like (not shown) external of the electrode. Plunger 38, which may be made of tungsten or an alloy thereof, the cylindrical body 22 of the electrode 10, and the workpiece 44, are connected to a direct current power supply as known in the art.

This particular configuration provides an alternate means of arc plasma initiation which will not produce electromagnetic interference (EMI) or contamination of the workpiece or electrode tip. When initiation of arc plasma is desired, retractable plunger 38 is moved downward into the first throughbore 28 with the simultaneous introduction of a working or electrode gas as depicted by the arrows in FIGS. 3C and 3D. As the plunger comes into contact with step 32 at the juncture of the first and second throughbores, a small arc starting current of from about 1 amp to about 5 amps is established between the plunger and the step with the electrode negative and the plunger positive. The workpiece is also made positive, although no current flows to it and at this time. Also, the flow of electrode gas is not completely blocked by the plunger 38 contacting the step 32. Once the arc starting current is established the plunger is retracted slightly (about 0.10 inch) so that a gap exists between the plunger tip 40 and the electrode step. A low current arc 42 will thus be created between the plunger and the step in the electrode. The plunger is then disconnected from the power supply which will cause the arc to transfer down through the second throughbore in the electrode so that it is established between the negative electrode and the positive workpiece 44. The current is then increased to the welding value as depicted by the arc in FIG. 3D.

Figure 4A:
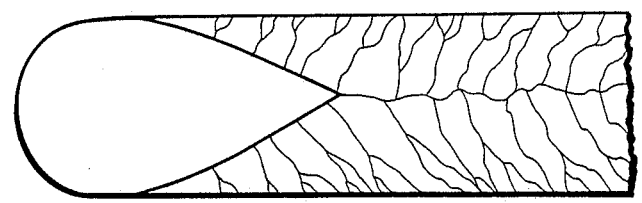
FIG. 4A illustrates weld pool geometry on solidification macro-structure resulting from a typical tungsten electrode.
Figure 4B:
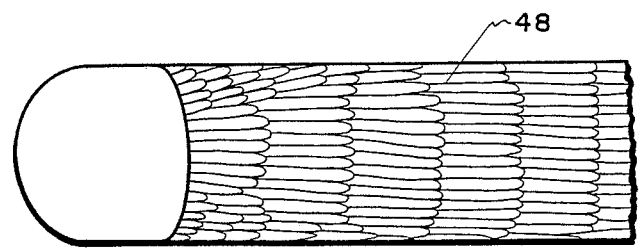
FIG. 4B illustrate a weld pool surface depicting columnar grain development in an eliptical weld resulting from the utilization of the hollow electrode of the present invention.

During the subsequent welding operation, it has been found that the welding arc is established at the electrode point 26, which is offset from the central axis of the hollow electrode. This results in the electrode gas not being substantially heated or ionized by the arc. Thus, a stream of relatively cool electrode gas will impinge directly upon the weld pool surface. This increases the cooling rate of the weld pool causing it to solidify more rapidly resulting in the elimination of unfavorably oriented grains (see FIG. 4A). As shown in FIG. 4B, the progressive change in the weld pool shape and thus the direction of the maximum thermal gradient is reflected in the survival of many more columnar grains 48.

Operating a gas tungsten arc welding apparatus using a hollow electrode according to the present invention improves the stability and repeatability of welds obtained thereby. Furthermore, the arc can be initiated without generating EMI or contaminating the workpiece or electrode tip. Changes in the weld pool cooling rate improve the weld pool shape, directions of maximum thermal gradients, and grain orientation.

What is claimed and desired to be secured in U.S. Letters Patents is:

1. A hollow electrode for use in an inert gas arc welding apparatus comprising:
   (1) an electrically conductive cylindrical body having a proximate end and a working end;
   (2) a first cylindrical throughbore originating at the proximate end and extending into the cylindrical body said first throughbore including a plunger movably retained within the first throughbore;
   (3) a second cylindrical throughbore terminating at the working end and having an interior diameter of less than the first throughbore;
   (4) a step including surface areas defining a juncture of the first and second throughbores;
   (5) a passageway defined by the throughbores and extending into and through the electrode for conveying a working gas; and
   (6) an electrode face forming a terminus at the working end of the hollow electrode and further comprising a lune-shaped radial surface and two tapered intersecting cone-shaped angled surfaces.

2. A method for initiation of an arc between a hollow electrode and a workpiece, said electrode comprising:
   (1) an electrically conductive cylindrical body having a proximate end and a working end;
   (2) a first cylindrical throughbore originating at the proximate end and extending into the cylindrical body said first throughbore including a plunger movably retained within the first throughbore;
   (3) a second cylindrical throughbore terminating at the working end and having an interior diameter of less than the first throughbore;
   (4) a step including surface areas defining a juncture of the first and second throughbores;
   (5) a passageway defined by the throughbores and extending into and through the electrode for conveying a working gas;
   (6) an electrode face forming a terminus at the working end of the hollow electrode and further comprising a lune-shaped radial surface and two tapered intersecting cone-shaped angled surfaces; and said method comprising:
   (1) introduction of an electrode gas into the first throughbore;
   (2) causing the gas to flow through the first throughbore and the movable plunger, through the juncture into the second throughbore to exit at the electrode terminus;
   (3) moving the plunger to contact the step with working gas flowing through the juncture;
   (4) causing an arc starting current to travel between the cylindrical body and the plunger at the juncture;
   (5) withdrawing the plunger from the juncture to establish an arc between the plunger and the step; and
   (6) then disconnecting a power supply from the plunger after the initial arc is established to effect an arc transfer from the step so that the arc is positioned between the terminus at the working end and the workpiece.

3. The method of claim 2 wherein the electrode gas is selected from argon, helium or a mixture thereof.

4. The method of claim 2 wherein the arc starting current is at a level of from about one (1) amp to about five (5) amps.

* * * * *